United States Patent
Sethi et al.

(10) Patent No.: US 12,307,281 B2
(45) Date of Patent: May 20, 2025

(54) VIRTUAL MACHINE MIGRATION BASED ON POWER UTILIZATION

(71) Applicant: Dell Products L.P., Round Rock, TX (US)

(72) Inventors: Parminder Singh Sethi, Ludhiana (IN); Suren Kumar, Bangalore (IN); Durai S. Singh, Chennai (IN)

(73) Assignee: Dell Products L.P., Round Rock, TX (US)

(*) Notice: Subject to any disclaimer, the term of this patent is extended or adjusted under 35 U.S.C. 154(b) by 737 days.

(21) Appl. No.: 17/695,446

(22) Filed: Mar. 15, 2022

(65) Prior Publication Data
US 2023/0297402 A1    Sep. 21, 2023

(51) Int. Cl.
    G06F 9/455    (2018.01)
    G06F 9/50     (2006.01)

(52) U.S. Cl.
    CPC ........ G06F 9/45558 (2013.01); G06F 9/5094 (2013.01); *G06F 2009/4557* (2013.01)

(58) Field of Classification Search
    None
    See application file for complete search history.

(56) References Cited

U.S. PATENT DOCUMENTS

| | | | | |
|---|---|---|---|---|
| 8,566,825 B2 * | 10/2013 | Bozek | ................... | G06F 9/5077 718/1 |
| 8,615,579 B1 * | 12/2013 | Vincent | ................. | G06F 9/5094 709/224 |
| 9,720,727 B1 * | 8/2017 | Vincent | ................. | G06F 9/4893 |
| 10,101,787 B1 * | 10/2018 | Bailey | ................... | G06F 1/3206 |
| 2005/0251802 A1 * | 11/2005 | Bozek | ................... | G06F 9/5077 718/1 |
| 2009/0172125 A1 * | 7/2009 | Shekhar | ............... | G06F 16/214 709/215 |
| 2010/0115509 A1 * | 5/2010 | Kern | ..................... | G06F 1/3287 718/1 |
| 2012/0296585 A1 * | 11/2012 | Chen | ........................ | G06F 1/28 702/61 |

(Continued)

OTHER PUBLICATIONS

Chen et al.; "Policy Based Power Management in Cloud Environment with Intel Intelligent Power Node Manager"; 2012 IEEE 16th International Enterprise Distributed Object Computing Conference Workshops; DOI 10.1109/EDOCW.2012.18; (Chen_2012.pdf; pp. 66-69) (Year: 2012).*

(Continued)

*Primary Examiner* — Hiren P Patel
(74) *Attorney, Agent, or Firm* — Ryan, Mason & Lewis, LLP

(57) ABSTRACT

A method comprises retrieving power utilization data of a plurality of host devices and identifying at least one virtual machine for migration from a source host device to a target host device of the plurality of host devices. In the method, power utilization of the at least one virtual machine is predicted. The target host device is determined based, at least in part, on the power utilization data of the plurality of host devices and the predicted power utilization of the at least one virtual machine. The method further comprises migrating at least one virtual machine from the source host device to the target host device.

20 Claims, 10 Drawing Sheets

(56) References Cited

U.S. PATENT DOCUMENTS

| | | | | |
|---|---|---|---|---|
| 2013/0042123 | A1* | 2/2013 | Smith | G06F 9/5077 |
| | | | | 713/300 |
| 2014/0200839 | A1* | 7/2014 | Doi | G06F 11/3062 |
| | | | | 702/60 |
| 2019/0250693 | A1* | 8/2019 | Mizuno | G06F 1/32 |
| 2019/0278626 | A1* | 9/2019 | Kodama | G06F 9/5094 |
| 2021/0034436 | A1* | 2/2021 | Tian | G06F 9/45558 |
| 2021/0042140 | A1* | 2/2021 | Paul | G06F 1/3206 |
| 2023/0273807 | A1* | 8/2023 | Uppalapati | G06F 1/3206 |
| | | | | 718/1 |

OTHER PUBLICATIONS

Ruan et al.; "Virtual machine allocation and migration based on performance-to-power ratio in energy-efficient clouds"; 2019 Elsevier B.V.; https://doi.org/10.1016/j.future.2019.05.036; (Ruan_2019.pdf; pp. 380-394) (Year: 2019).*

Dhanoa et al.; "Energy Efficient Virtual Machine Migrations based on Genetic Algorithm in Cloud Data Center"; 2016 IEEE; 978-9-3805-4421-2/16; (Dhanoa_2016.pdf; pp. 3335-3340) (Year: 2016).*

Djennane et al.; "Energy-Efficient Algorithm for Load Balancing and VMs Reassignment in Data Centers"; 2018 6th International Conference on Future Internet of Things and Cloud Workshops; DOI 10.1109/W-FiCloud.2018.00043; (Djennane_2018.pdf; pp. 225-230) (Year: 2018).*

Pavithra et al.; "Energy Efficient Resource Provisioning with Dynamic VM Placement Using Energy Aware Load Balancer in Cloud"; IEEE 2016; 978-1-5090-2552-7; (Pavithra_2016.pdf; pp. 1-6) (Year: 2016).*

Vmware, Inc., "What is vSphere 7?" https://www.vmware.com/products/vsphere.html, Accessed Mar. 1, 2022, 3 pages.

Vmware, Inc., "How vSphere HA Works," https://docs.vmware.com/en/VMware-vSphere/7.0/com.vmware.vsphere.avail.doc/GUID-33A65FF7-DA22-4DC5-8B18-5A7F97CCA536.html, Accessed Mar. 1, 2022, 3 pages.

* cited by examiner

| Host name | CPU utilization | Memory utilization | Power utilization |
|---|---|---|---|
| Host Device #5 | 35% | 15% | 25% |
| Host Device #3 | 30% | 20% | 35% |
| Host Device #6 | 20% | 35% | 45% |
| Host Device #4 | 45% | 35% | 55% |
| Host Device #1 | 60% | 60% | 70% |
| Host Device #2 | 70% | 65% | 80% |

VIRTUAL MACHINE MIGRATION BASED ON POWER UTILIZATION

FIELD

The field relates generally to information processing systems, and more particularly to virtual machine management in such information processing systems.

BACKGROUND

In a virtualization scenario, resources of a physical device are allocated to virtual machines (VMs). Virtual machine migration is a process by which one or more virtual machines are migrated from one physical device to another physical device. The migration of virtual machines is used in connection with resource and load management among physical devices. Virtual machine migration also facilitates isolation of applications, and can be performed in the event of failure of a hosting physical environment.

SUMMARY

Embodiments provide a migration management platform in an information processing system.

For example, in one embodiment, a method comprises retrieving power utilization data of a plurality of host devices and identifying at least one virtual machine for migration from a source host device to a target host device of the plurality of host devices. In the method, power utilization of the at least one virtual machine is predicted. The target host device is determined based, at least in part, on the power utilization data of the plurality of host devices and the predicted power utilization of the at least one virtual machine. The method further comprises migrating at least one virtual machine from the source host device to the target host device.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 6 depicts a table of possible target host devices ranked based on power utilization in an illustrative embodiment.

DETAILED DESCRIPTION

Figure 1:
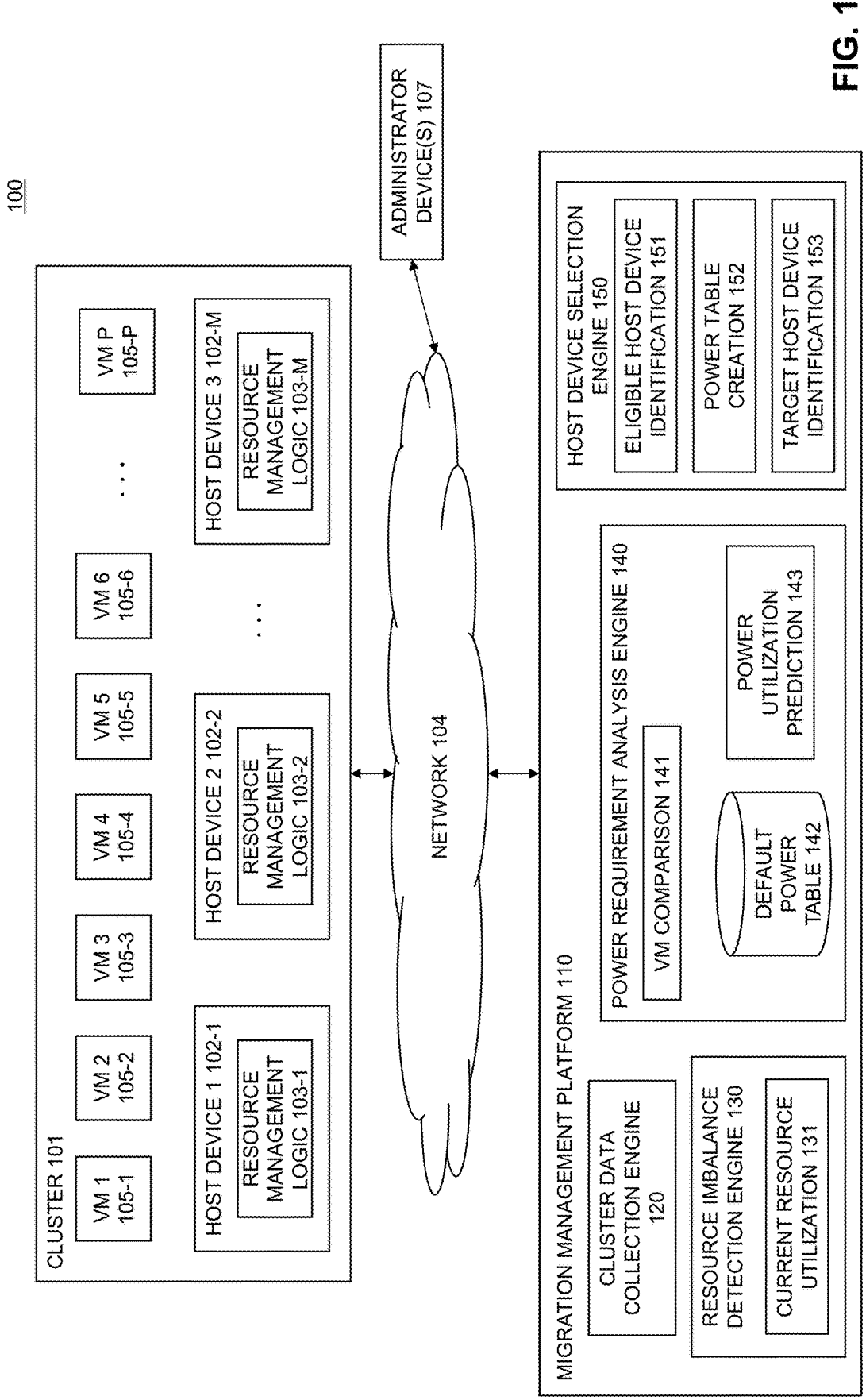
FIG. 1 depicts an information processing system with a migration management platform for managing virtual machine migration in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "cluster" is to be broadly construed to refer to multiple devices, such as, for example, multiple servers, host devices or other physical devices (also referred to herein as "nodes"), that are grouped together to deliver services such as, for example, virtualization services including, but not necessarily limited to, hosting of virtual machines. Nodes of a cluster can be redundant. In one or more embodiments, a plurality of virtual machines are hosted by and can migrated between a plurality of host devices in a cluster.

FIG. 1 shows an information processing system 100 configured in accordance with an illustrative embodiment. The information processing system 100 comprises a cluster 101 including host devices 102-1, 102-2, . . . 102-M (collectively "host devices 102"), with each host device 102 including respective instances of resource management logic 103-1, 103-2, . . . 103-M (collectively "resource management logic 103"). The cluster 101 further includes a plurality of virtual machines (VMs) 105-1, 105-2, 105-3, 105-4, 105-5, 105-6, . . . 105-P (collectively "virtual machines 105" or "VMs 105") running on the host devices 102. As explained further herein, the distribution of which virtual machines 105 run on particular ones of the host devices 102 varies over time, and some host devices 102 may have more virtual machines 105 running thereon than other host devices 102 at a given time. The information processing system 100 further includes one or more administrator devices 107. Although one cluster 101 is shown in FIG. 1, the embodiments are not necessarily limited thereto, and the information processing system may comprise more than one cluster the same as or similarly situated to the cluster 101. The cluster 101 including host devices 102, and the administrator device(s) 107, communicate over a network 104 with a migration management platform 110. The variables M and P and other similar index variables herein such as K and L are assumed to be arbitrary positive integers greater than or equal to one.

The host devices 102 are nodes of cluster 101, and can comprise, for example, desktop, laptop or tablet computers, servers, or other types of processing devices. The administrator device(s) 107 can comprise, for example, desktop, laptop or tablet computers, mobile telephones, or other types of processing devices. The host devices 102 and administrator device(s) 107 are capable of communicating with the migration management platform 110 over the network 104. The host devices 102 and administrator devices 107 are examples of what are more generally referred to herein as "processing devices." Some of these processing devices are also generally referred to herein as "computers." The host devices 102 comprise virtualized computing resources, such as one or more of the VMs 105, as well as containers or other virtualized computing resources. The administrator device(s) 107 may also or alternately comprise virtualized computing resources. The host devices 102 and/or administrator device(s) 107 in some embodiments comprise respective computers associated with a particular company, organization or other enterprise.

The terms "user" or "administrator" herein are intended to be broadly construed so as to encompass numerous arrangements of human, hardware, software or firmware entities, as well as combinations of such entities. At least a portion of the available services and functionalities provided by the migration management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the migration management platform 110, as well as to support communication between the migration management platform 110 and connected devices (e.g., host devices 102 and administrator device(s) 107) and/or other related systems and devices not explicitly shown.

In some embodiments, the host devices 102 and/or administrator device(s) 107 are assumed to be associated with repair and/or support technicians, system administrators, information technology (IT) managers, software developers, release management personnel or other authorized personnel configured to access and utilize the migration management platform 110.

Conventional approaches for the migration of virtual machines do not consider the power utilization of target host devices. As a result, after virtual machine migration to a target host device is complete, if the power utilization of the target host device is high and the target host device does not have sufficient power to accommodate the virtual machine: (i) the migrated virtual machine will be remigrated to the original host device or to another host device; and (ii) performance of the target host device is impacted, as host device performance is related to available power. Moreover, remigration of virtual machines consumes power, which further exacerbates the performance of the target host device. As a result, the target host device may become unresponsive (e.g., hang, freeze, etc.) and may reboot unexpectedly. Target host devices may have high power utilization and/or inadequate power due to, for example, a failure of a power supply and/or pre-configured power utilization restrictions such as, but not necessarily limited, power cap restrictions.

Illustrative embodiments provide techniques for intelligently predicting and forecasting the power requirements of virtual machines (e.g., virtual machines 105) and the power utilization of host devices (e.g., host devices 102). Advantageously, the embodiments herein provide a migration management platform 110, which predicts and forecasts the power requirements of virtual machines 105 and the power utilization of host devices 102. As a result, virtual machines 105 are migrated to target host devices 102 having the capability to handle virtual machine workloads without significant impact to the performance of the target host devices 102, thereby preventing the need for remigration of the virtual machines 105.

In one or more embodiments, power consumption, as well as central processing unit (CPU) and memory imbalances between host devices 102 are considered in connection with virtual machine migration. The embodiments provide a framework for recommending migration of virtual machines 105 to certain host devices 102 in a cluster 101 of host devices 102 hosting multiple virtual machines 105. The recommendations are based, at least in part, on an analysis of the power usage of the virtual machines 105 and host devices 102, which are part of the cluster 101. According to one or more embodiments, current power utilization (e.g., collected in real-time) of the virtual machines 105 and host devices 102 in a given virtualization environment is determined from operational information available via operating system passthrough channels. Future power utilization of the virtual machines 105 is predicted by identifying similar virtual machines 105 in the cluster 101 (or in another cluster if available) and analyzing the power usage history of the similar virtual machines 105. Based on the current and predicted power utilization, appropriate target host devices 102 having sufficient power, CPU availability, and memory are identified, and the virtual machines 105 are migrated to the identified host devices 102.

The migration management platform 110 in the present embodiment is assumed to be accessible to the host devices 102 and administrator device(s) 107 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the migration management platform 110 includes a cluster data collection engine 120, a resource imbalance detection engine 130, a power requirement analysis engine 140 and a host device selection engine 150. The resource imbalance detection engine 130 includes a current resource utilization layer 131. The power requirement analysis engine 140 includes a virtual machine (VM) comparison layer 141, at least one default power table 142 and a power utilization prediction layer 143. The host device selection engine 150 includes an eligible host device identification layer 151, a power table creation layer 152 and a target host device identification layer 153.

Figure 2:
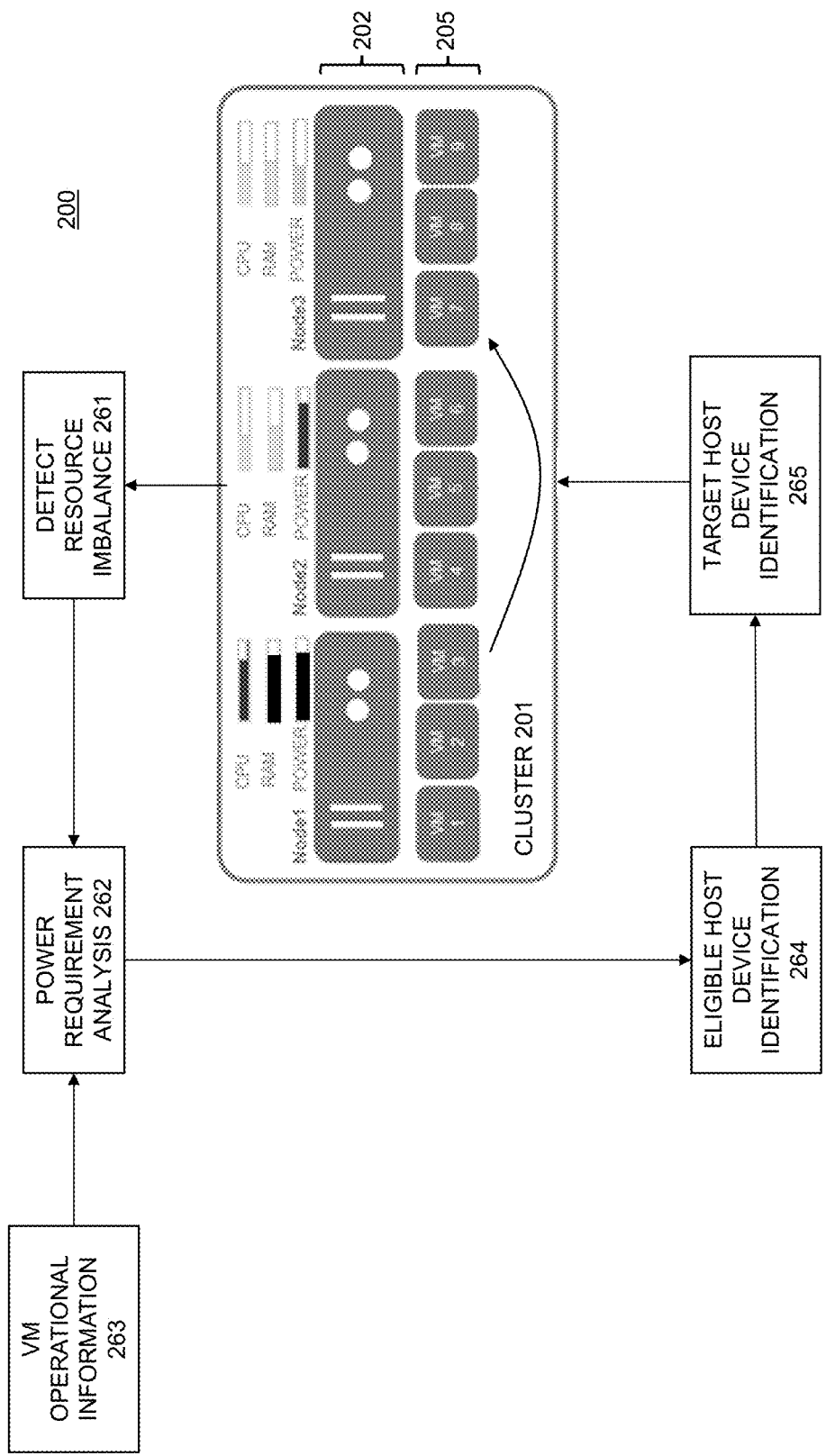
FIG. 2 depicts an operational flow for managing virtual machine migration in an illustrative embodiment.

FIG. 2 depicts an operational flow 200 for managing virtual machine migration in an illustrative embodiment. FIG. 2 shows a cluster 201, which can be the same as or similar to the cluster 101. The cluster 201 comprises a plurality of VMs 205 (VM 1, VM 2, VM 3, VM 4, VM 5, VM 6, VM 7, VM 8 and VM 9) and a plurality of nodes 202 (Node1, Node2 and Node3). The VMs 205 and the nodes 202 are configured the same as or similar to the VMs 105 and host devices 102, respectively. FIG. 2 also shows CPU utilization, memory (e.g., random access memory (RAM)) utilization and power utilization levels of Node1, Node2 and Node3, respectively. CPU utilization, memory utilization and power utilization levels at or approaching relatively higher levels (e.g., at or above predetermined thresholds) where virtual machine migration to another node may be warranted are shown in a darker color than CPU utilization, memory utilization and power utilization levels at lower levels (e.g., below predetermined thresholds) where virtual machine migration may not be needed. As can be seen in FIG. 2, VM3 is being migrated from Node1 (source node) to Node3 (target node). Reference to FIG. 2 will be made in connection with descriptions of the information processing system 100 in FIG. 1 and vice versa.

The cluster data collection engine 120 is configured to retrieve power utilization, CPU utilization, memory utilization or other resource utilization metrics of the host devices 102 (or nodes 202) within a cluster 101 (or 201) by using passthrough channels of the operating systems of the host devices 102. For example, the instances of resource management logic 103 corresponding to the host devices 102 monitor performance of the host devices 102 and compile utilization data (e.g., for memory, megabytes (MB), gigabytes (GB) or percentage used, for CPU, percentage used and for power, Watts or percentage used). According to an embodiment, the utilization values correspond to power, CPU and memory utilization by respective ones of virtual machines 105 running on the host devices 102. The utilization values can also correspond to the overall device (e.g., overall power utilization for a host device 102), respective applications (e.g., respective applications running on a host device 102 or one or more virtual machines 105), respective workloads (e.g., respective workloads running on a host device 102 or one or more virtual machines 105), respective workload threads or other level of granularity. According to illustrative embodiments, the cluster data collection engine 120 collects current utilization values from the instances of resource management logic 103 for respective ones of the host devices 102 at a given time or over a given time period (1 second, 10 microseconds, etc.). The cluster data collection engine 120 is also configured to collect historical utilization values from the instances of resource management logic 103 for respective ones of the host devices 102 for given historical time periods (e.g., past year, 6 months, 3 months, month, week, etc.).

Referring to block 261 of FIG. 2, the utilization data collected by the cluster data collection engine 120 is transmitted to the resource imbalance detection engine 130, which determines imbalance of one or more resources between host devices 102 (or nodes 202) in a cluster 101 (or 201). In more detail, the current resource utilization layer 131 determines a current utilization of resources (e.g., power, CPU and/or memory) by the host devices 102 in a cluster 101. In a non-limiting illustrative example, such utilization is illustrated by the CPU, RAM and power bars in FIG. 2. The resource imbalance detection engine 130 compares the resource utilization by the host devices 102 and determines that utilization of one or more of the resources in at least a first one of the host devices 102 is too high (e.g., at or greater than predetermined utilization thresholds) and that utilization of one or more of the resources in at least a second one of the host devices 102 is low (e.g., lower than predetermined utilization thresholds). For example, referring to the cluster 201, the CPU, RAM and power utilization of Node1 are relatively high, while the CPU and RAM utilization of node2 are relatively low and the CPU, RAM and power utilization of node3 are relatively low, thereby resulting in a resource utilization imbalance among nodes 1-3.

The current resource utilization layer 131 determines a current utilization of resources (e.g., power, CPU and/or memory) by the VMs 105 running on a host device 102 with high resource utilization and identifies a given VM of the VMs 105 running on the host device 102 with high resource utilization to be migrated to another host device 102 of the cluster 101. Referring to block 262 of FIG. 2, the power requirement analysis engine 140 predicts a power requirement of a VM 105 (or 205) to be migrated.

Figure 3:
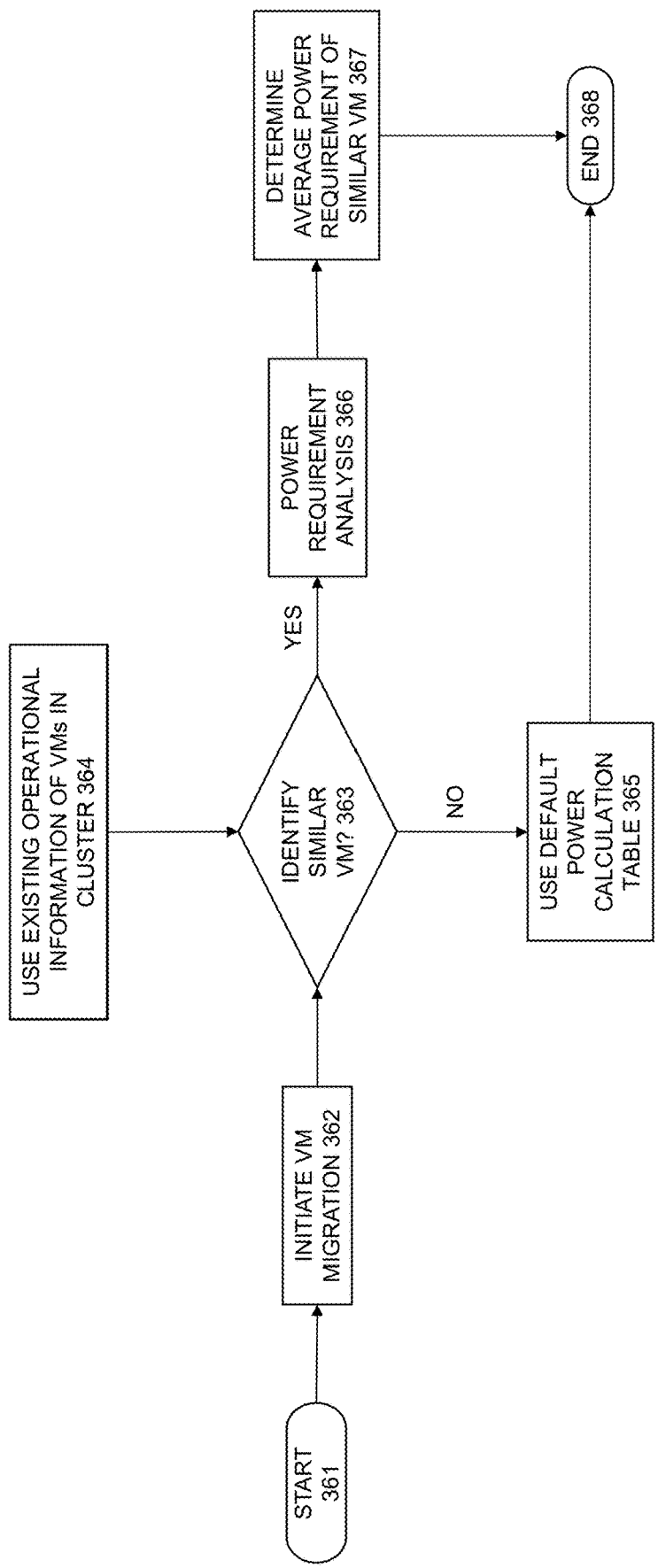
FIG. 3 depicts an operational flow for determining power requirements of a virtual machine to be migrated in an illustrative embodiment.

Referring to the operational flow 300 for determining power requirements of a virtual machine to be migrated in FIG. 3, power requirement prediction may be performed by using at least one of two methods. Following a beginning (block 361) of the operational flow 300 and initiation of virtual machine migration (block 362), at block 363, the VM comparison layer 141 of the power requirement analysis engine 140 compares the virtual machines 105 in the cluster 101 to determine whether there are any similar virtual machines 105 to the virtual machine to be migrated. Referring to block 263 of FIG. 2 and block 364 of FIG. 3, the comparison is performed using operational information of the virtual machines 105 (or 205) in the cluster 101 (or 201) to determine whether any of the VMs 105 in the cluster 101 have the same or a similar (e.g., overlapping) configuration to the VM 105 to be migrated. For example, the operational information may comprise details of the types of workloads and applications running on the VMs 105, as well as the associated hardware being used by the VMs 105 to execute the applications and workloads. The determination of whether there are similar VMs 105 to the VM 105 being migrated is based on whether the types of workloads and applications running on the VMs 105, as well as the associated hardware are the same or similar to those of the VM 105 to be migrated. Such operational information is collected by the cluster data collection engine 120 via, for example, the instances of resource management logic 103.

Referring to block 366 of FIG. 3, according to an embodiment, based on an analysis of the recent or real-time operational information of the VMs 105 in the cluster 101, if a similar VM 105 is available, the power utilization prediction layer 143 analyzes the power requirements of the similar VM 105. Referring to block 367, the power utilization prediction layer 143 computes an average power requirement of the similar VM 105 over a particular time interval. The computed average power requirement is considered as the power requirement of a VM 105 (or 205) to be migrated, and the process ends (block 368). A target host device 102 (or node 202) should have enough available power to meet this power requirement. As used herein the term "average" is to be broadly construed to refer to, for example, mean, mode, median or other technique to find average. For example, there may be different power requirements for a similar VM 105 at different times within a given time interval, and the power utilization prediction layer 143 computes an average of the different power requirements. In other embodiments, there may be more than one similar VM 105, in which case, the computed average power requirement is an average of the power requirements of respective ones of the multiple similar VMs 105.

Referring to block 365, if a similar VM 105 is not available and/or if operational information of other VMs 105 in the cluster 101 is not available, the power utilization prediction layer 143 utilizes a default power calculation table (default power table 142) to provide an approximate average power requirement for the VM 105 to be migrated. The approximate average power requirement is based on resource utilization by the VM 105 to be migrated such as, but not necessarily limited to, CPU utilization, memory utilization, etc. The default power table 142, which can be in matrix form, includes resource utilization values (e.g., CPU and memory utilization values) mapped to predetermined power requirements of a virtual machine. The predetermined power requirements can be provided by administrators and/or original equipment manufacturers (OEMs). The power utilization prediction layer 143 matches resource utilization values of the VM 105 to be migrated to resource utilization values in the default power table 142 and their corresponding power requirements to determine the approximate average power requirement. In some embodiments, the approximate average power requirement may be the average of multiple power requirements corresponding to respective resource utilization values of the VM 105 to be migrated. The approximate average power requirement is considered as the power requirement of a VM 105 (or 205) to be migrated, and the process ends (block 368). A target host device 102 (or node 202) should have enough available power to meet this power requirement.

Figure 4:
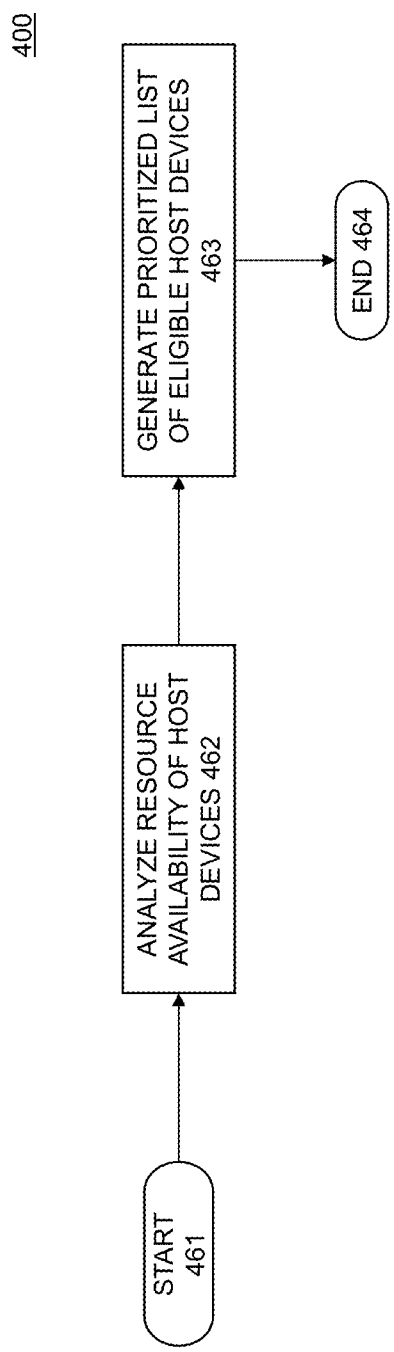
FIG. 4 depicts an operational flow for generating a ranking of eligible host devices in an illustrative embodiment.

The eligible host device identification layer 151 of the host device selection engine 150 identifies at least a subset of the host devices 102 as eligible target host devices based, at least in part, on power utilization data of the host devices 102 and utilization data of one or more additional resources (e.g., CPU, memory) of the host devices 102. Referring to blocks 461 and 462 of the operational flow 400 of FIG. 4 for generating a ranking of eligible host devices, following a beginning (block 461) of the operational flow 400, the eligible host device identification layer 151 analyzes the availability of resources, such as power, a CPU and memory, and identifies at least the subset of the host devices 102 having availabilities of resources exceeding predetermined thresholds or usages below predetermined thresholds as eligible target host devices at block 462. For example, in illustrative embodiments, the eligible target host devices have CPU, memory and power usages below predetermined thresholds. Referring to block 463 of FIG. 4, in identifying the subset of the host devices 102, the eligible host device identification layer 151 ranks the host devices 102 according to a combination of their power utilization and their utilization of one or more additional resources, with the host devices 102 having the lowest resource utilization being ranked the highest. In other words, host devices in an eligible host device list are prioritized based on their resource availability. For example, the host device 102 having the most available resources would be on the top of the eligible host device list. The process ends at block 464.

Figure 5:
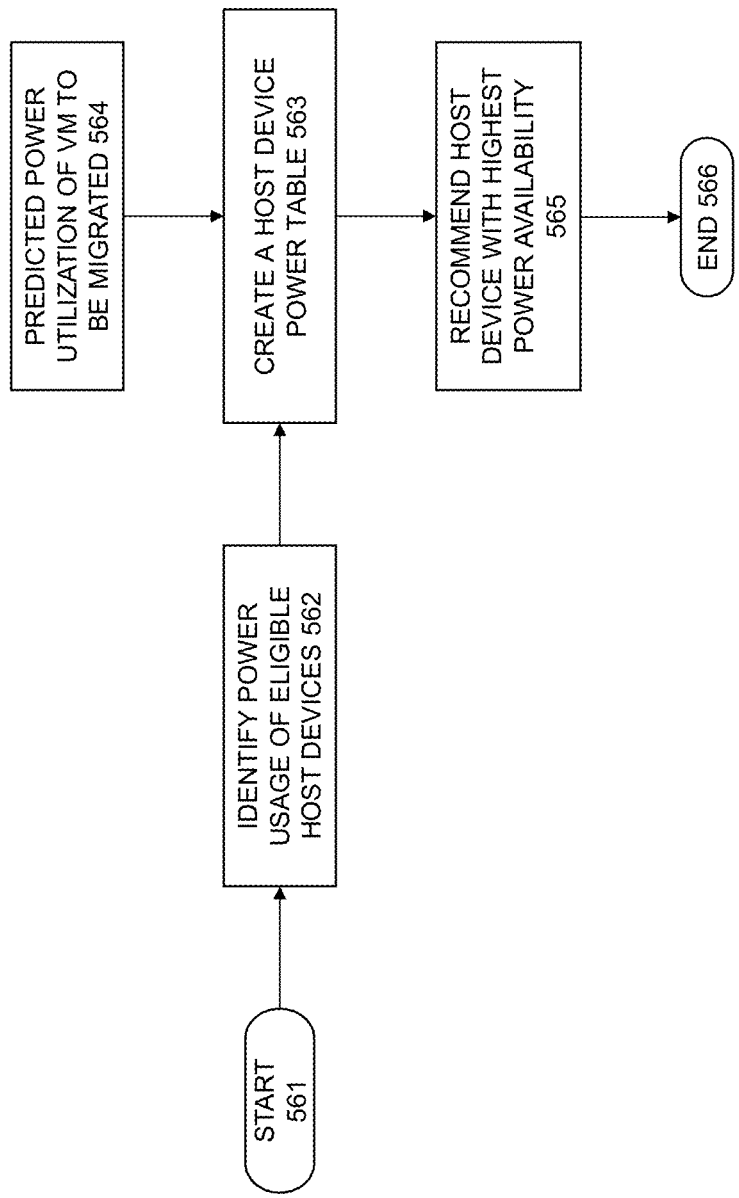
FIG. 5 depicts an operational flow for identifying and recommending a target host device to which a virtual machine is to be migrated in an illustrative embodiment.

Referring to block 562 of the operational flow 500 of FIG. 5 for identifying and recommending a target host device to which a virtual machine is to be migrated, following a beginning (block 561) of the operational flow 500, the power table creation layer 152 identifies power utilization of the eligible host devices 102 at a particular point in time (e.g., current time (real-time) or a recent past time) and ranks the eligible host devices 102 (e.g., the identified subset of the host devices 102) according to their respective power utilizations. At block 563, the power table creation layer 152 generates a host device power table based on the ranking. Referring to block 564, in generating the host device power table, the power table creation layer 152 compares the predicted power utilization of the VM 105 to be migrated (determined by the power utilization prediction layer 143) with the current (real-time) power availability of the eligible host devices to confirm that the eligible host devices have enough available power for the VM 105 to be migrated. If one or more of the eligible host devices does not have sufficient power at the time of the comparison, those host devices are not included in the host device power table. Referring to block 565, the target host device identification layer 153 recommends as the target host device, the host device from the host device power table having the highest power availability, and the process ends at block 566.

Referring to FIG. 6, an example host device power table 600 for a plurality of eligible host devices (Host Device #1, Host Device #2, Host Device #3, Host Device #4, Host Device #5 and Host Device #6) is sorted in ascending order of power utilization. Other resource values including CPU and memory utilization are also included in the host device power table 600. In accordance with one or more embodiments, if a migration of a VM 105 fails, the target host device identification layer 153 recommends as the target host device a host device with a next least power utilization from the host device power table.

Figure 7:
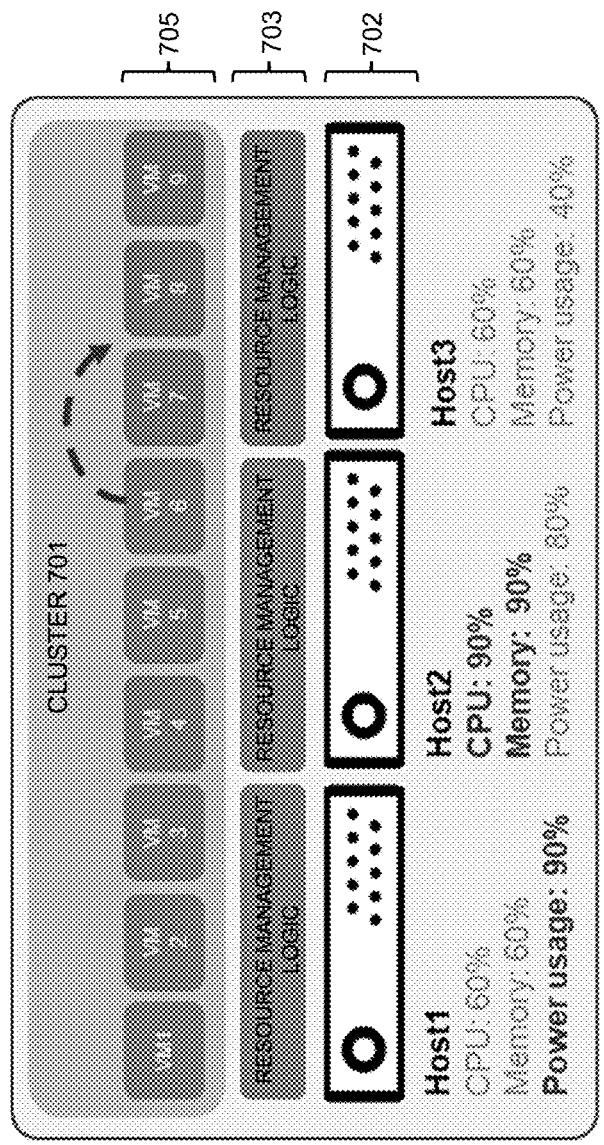
FIG. 7 depicts a migration of a virtual machine from one host device to another host device in an illustrative embodiment.

FIG. 7 illustrates an example cluster 701 in which a virtual machine migration is occurring. The cluster 701 can be the same as or similar to the clusters 101 and 201. Like the cluster 201, the cluster 701 comprises a plurality of VMs 705 (VM 1, VM 2, VM 3, VM 4, VM 5, VM 6, VM 7, VM 8 and VM 9) and a plurality of host devices 702 (Host1, Host2 and Host3). The VMs 705 and the host devices 702 are configured the same as or similar to the VMs 105/205 and host devices 102 or nodes 202 in FIGS. 1 and 2. The cluster 701 further includes instances of resource management logic 703 configured the same as or similar to the instances of resource management logic 103 in FIG. 1. FIG. 7 also shows CPU utilization, memory utilization and power utilization percentages of Host1, Host2 and Host3, respectively. For example, the CPU and memory utilization of Host1 and Host3 are each 60%, the CPU and memory utilization of Host2 are both 90% and power utilization (power usage) of Host1, Host2 and Host3 are 90%, 80% and 40%, respectively. As can be seen in FIG. 7, VM6 is being migrated from Host2 (source host device) to Host3 (target host device). Although Host1 has the same CPU and memory utilization as Host3, the algorithms of the embodiments are configured to select Host3 over Host1 since the power utilization of Host3 (40%) is less than the power utilization of Host1 (90%).

According to one or more embodiments, data repositories or databases referred to herein (e.g., data repositories for data collected by the cluster data collection engine 120) can be configured according to a relational database management system (RDBMS) (e.g., PostgreSQL). In some embodiments, the data repositories or databases referred to herein are implemented using one or more storage systems or devices associated with the migration management platform 110. In some embodiments, one or more of the storage systems utilized to implement the data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the migration management platform 110, the cluster data collection engine 120, the resource imbalance detection engine 130, the power requirement analysis engine 140 and/or the host device selection engine 150 in other embodiments can be implemented at least in part externally to the migration management platform 110, for example, as stand-alone servers, sets of servers or other types of systems coupled to the network 104. For example, the cluster data collection engine 120, the resource imbalance detection engine 130, the power requirement analysis engine 140 and/or the host device selection engine 150 may be provided as cloud services accessible by the migration management platform 110.

The cluster data collection engine 120, the resource imbalance detection engine 130, the power requirement analysis engine 140 and/or the host device selection engine 150 in the FIG. 1 embodiment are each assumed to be implemented using at least one processing device. Each such processing device generally comprises at least one processor and an associated memory, and implements one or more functional modules for controlling certain features of the cluster data collection engine 120, the resource imbalance detection engine 130, the power requirement analysis engine 140 and/or the host device selection engine 150.

At least portions of the migration management platform 110 and the elements thereof may be implemented at least in part in the form of software that is stored in memory and executed by a processor. The migration management platform 110 and the elements thereof comprise further hardware and software required for running the migration management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the cluster data collection engine 120, the resource imbalance detection engine 130, the power requirement analysis engine 140, the host device selection engine 150 and other elements of the migration management platform 110 in the present embodiment are shown as part of the migration management platform 110, at least a portion of the cluster data collection engine 120, the resource imbalance detection engine 130, the power requirement analysis engine 140, the host device selection engine 150 and other elements of the migration management platform 110 in other embodiments may be implemented on one or more other processing platforms that are accessible to the migration management platform 110 over one or more networks. Such elements can each be implemented at least in part within another system element or at least in part utilizing one or more stand-alone elements coupled to the network 104. For example, in one or more embodiments, instances of the migration management platform 110 comprising the cluster data collection engine 120, the resource imbalance detection engine 130, the power requirement analysis engine 140, the host device selection engine 150 and other elements, or portions thereof, may be implemented on respective ones of the host devices 102.

It is assumed that the migration management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the cluster data collection engine 120, the resource imbalance detection engine 130, the power requirement analysis engine 140, the host device selection engine 150 and other elements of the migration management platform 110, and the elements thereof can each be implemented in the form of one or more LXCs running on one or more VMs. Other arrangements of one or more processing devices of a processing platform can be used to implement the cluster data collection engine 120, the resource imbalance detection engine 130, the power requirement analysis engine 140 and the host device selection engine 150, as well as other elements of the migration management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the migration management platform 110 to reside in different data centers. Numerous other distributed implementations of the migration management platform 110 are possible.

Accordingly, one or each of the cluster data collection engine 120, the resource imbalance detection engine 130, the power requirement analysis engine 140, the host device selection engine 150 and other elements of the migration management platform 110 can each be implemented in a distributed manner so as to comprise a plurality of distributed elements implemented on respective ones of a plurality of compute nodes of the migration management platform 110.

It is to be appreciated that these and other features of illustrative embodiments are presented by way of example only, and should not be construed as limiting in any way. Accordingly, different numbers, types and arrangements of system elements such as the cluster data collection engine 120, the resource imbalance detection engine 130, the power requirement analysis engine 140, the host device selection engine 150 and other elements of the migration management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the migration management platform can be offered to cloud infrastructure customers or other users as part of FaaS, CaaS and/or PaaS offerings.

Figure 8:
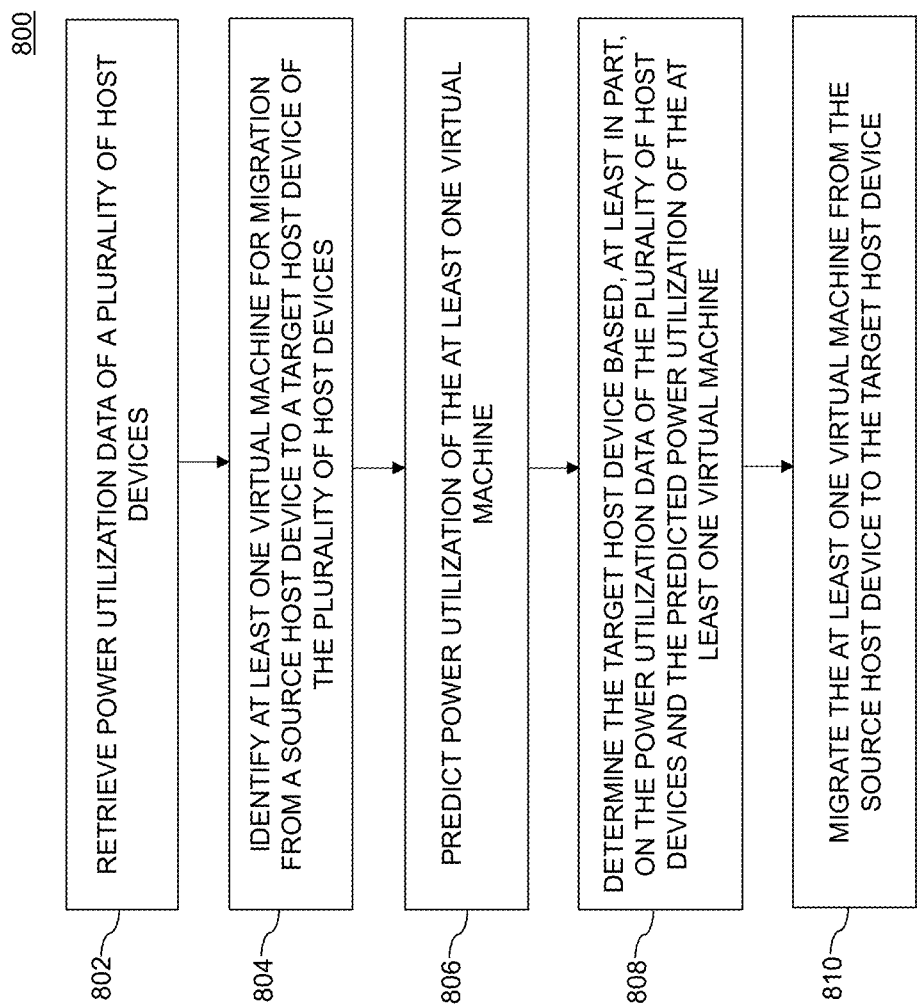
FIG. 8 depicts a process for management of virtual machine migration based on power utilization according to an illustrative embodiment.

The operation of the information processing system 100 will now be described in further detail with reference to the flow diagram of FIG. 8. With reference to FIG. 8, a process 800 for management of virtual machine migration based on power utilization as shown includes steps 802 through 810, and is suitable for use in the system 100 but is more generally applicable to other types of information processing systems comprising a migration management platform configured for virtual machine migration management.

In step 802, power utilization data of a plurality of host devices is retrieved. According to an embodiment, the power utilization data is retrieved through one or more operating system passthrough channels of the plurality of host devices. In one or more embodiments, the plurality of host devices comprise respective nodes of a cluster. However, it is to be understood that the host devices are not necessarily part of a cluster.

In step 804, at least one virtual machine is identified for migration from a source host device to a target host device of the plurality of host devices. The identifying of the at least one virtual machine for migration comprises determining a resource imbalance between two or more of the plurality of host devices based, at least in part, on the power utilization data of the plurality of host devices, and one or more of CPU utilization and memory utilization of the plurality of host devices.

In step 806, power utilization of the at least one virtual machine is predicted. According to an embodiment, the predicting of the power utilization includes identifying one or more other virtual machines in the cluster comprising at least one configuration overlapping with at least one configuration of the at least one virtual machine to be migrated, computing an average power utilization of the one or more other virtual machines, and using the average power utilization of the one or more other virtual machines as the predicted power utilization of the at least one virtual machine to be migrated. The predicting of the power utilization can also or alternatively include identifying at least one resource utilization value of the at least one virtual machine to be migrated, comparing the at least one resource utilization value of the at least one virtual machine to a mapping of virtual machine resource utilization values to virtual machine power utilization values, and determining the predicted power utilization of the at least one virtual machine to be migrated based, at least in part, on the mapping of the virtual machine resource utilization values to the virtual machine power utilization values. The at least one resource utilization value comprises a CPU utilization value and/or a memory utilization value of the at least one virtual machine to be migrated. The determining of the predicted power utilization of the at least one virtual machine to be migrated based, at least in part, on the mapping is performed in response to a lack of a virtual machine in the cluster comprising at least one configuration overlapping with at least one configuration of the at least one virtual machine to be migrated.

In step 808, the target host device is determined based, at least in part, on the power utilization data of the plurality of host devices and the predicted power utilization of the at least one virtual machine. In step 810, the at least one virtual machine is migrated from the source host device to the target host device.

In illustrative embodiments, at least a subset of the plurality of host devices is identified as eligible target host devices based, at least in part, on the power utilization data of the plurality of host devices and utilization data of one or more additional resources of the plurality of host devices. The identifying of at least the subset of the plurality of host devices as eligible target host devices comprises ranking the plurality of host devices according to a combination of power utilization and utilization of the one or more additional resources by respective ones of the plurality of host devices. The determining of the target host device comprises ranking the eligible target host devices according to power utilization by respective ones of the eligible target host devices, and assigning an eligible target host device with the least power utilization of the eligible target host devices as the target host device. An eligible target host device with a next least power utilization of the eligible target host devices is assigned as the target host device responsive to a failure of the migrating of the at least one virtual machine.

It is to be appreciated that the FIG. 8 process and other features and functionality described above can be adapted for use with other types of information systems configured to execute virtual machine migration management services in a migration management platform or other type of platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a migration management platform as disclosed herein can provide a number of significant advantages relative to conventional arrangements. For example, unlike previous approaches, which fail to consider power availability, the migration management platform advantageously predicts the power requirements of VMs that must be migrated by analyzing operational information of similar VMs within a cluster.

As an additional advantage, the embodiments provide techniques for analyzing the power available in host devices within a cluster other than a source host device, to determine eligible host devices for migration. The embodiments also provide techniques for prioritizing the hosts by comparing the resource requirements of the VMs to be migrated with the resources available in the eligible host devices.

Moreover, in the case of a failed migration of a VM, the embodiments provide for automatically selecting a next eligible host device from a priority list to be used a target host device for a virtual machine migration.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the migration management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a migration management platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
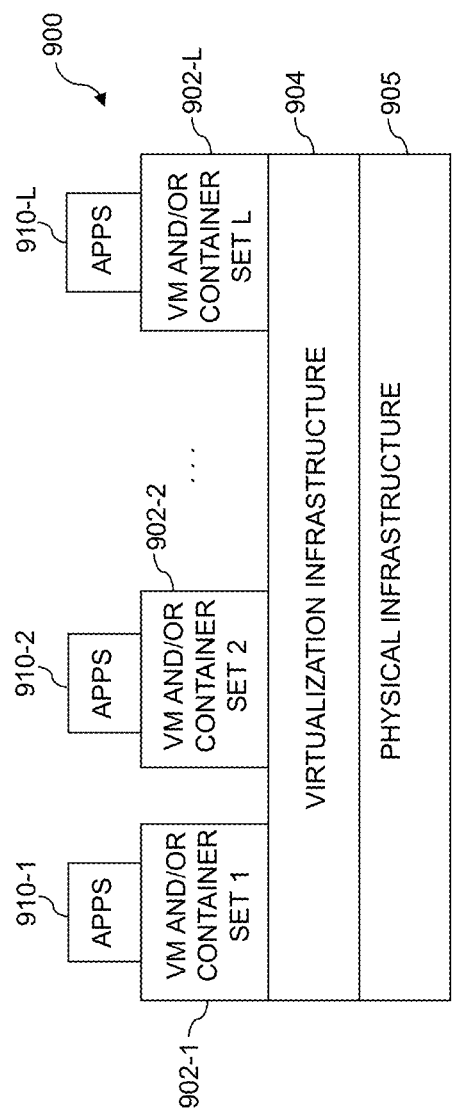
FIGS. 9 and 10 show examples of processing platforms that may be utilized to implement at least a portion of an information processing system according to illustrative embodiments.
Figure 10:
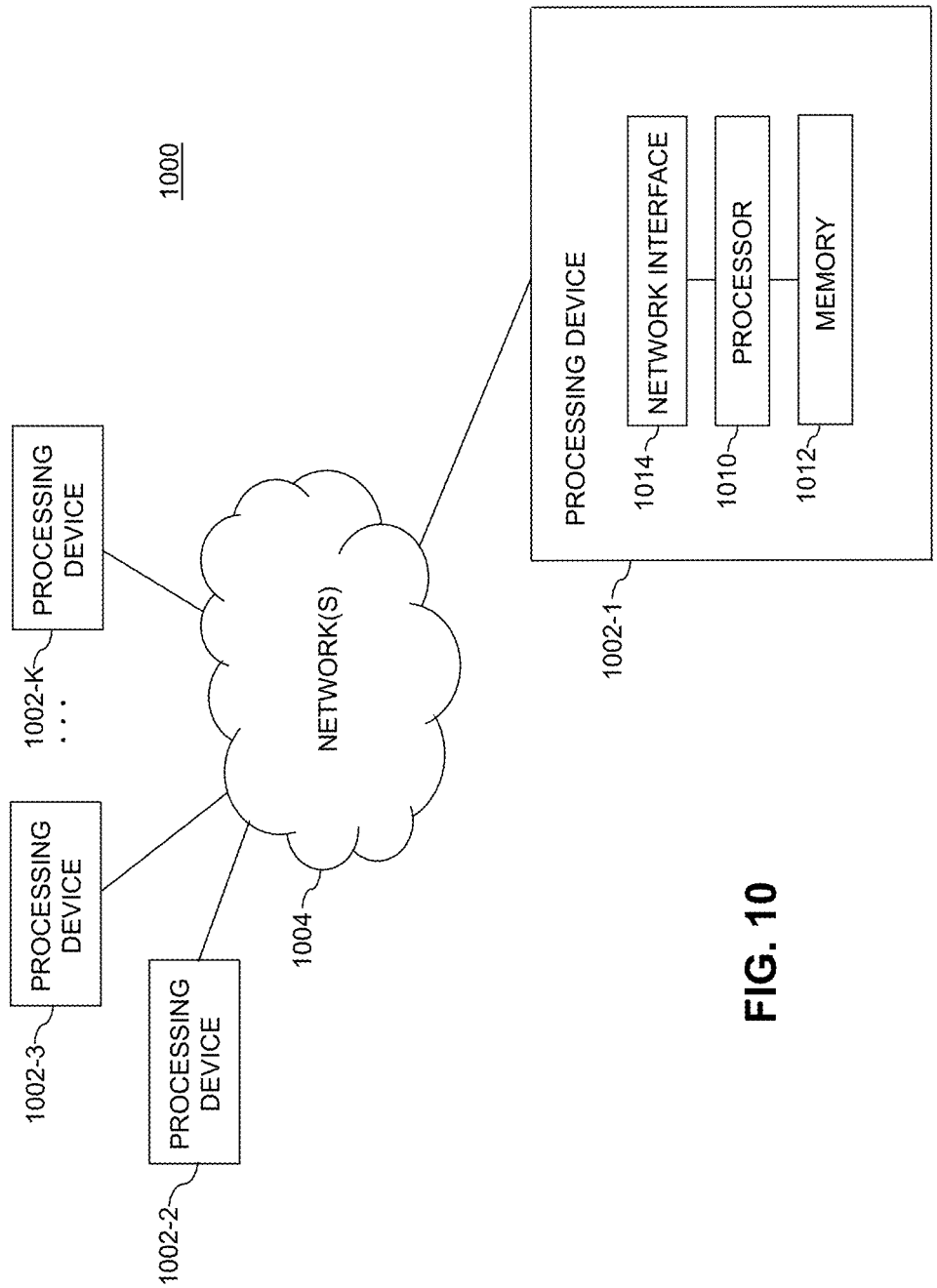

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a CPU, a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the migration management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and migration management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   retrieving power utilization data of a plurality of host devices;
   identifying at least one virtual machine for migration from a source host device to a target host device of the plurality of host devices;
   predicting power utilization of the at least one virtual machine;
   determining the target host device based, at least in part, on the power utilization data of the plurality of host devices and the predicted power utilization of the at least one virtual machine; and
   migrating the at least one virtual machine from the source host device to the target host device;
   wherein the predicting of the power utilization of the at least one virtual machine comprises:
   identifying at least one resource utilization value of the at least one virtual machine;
   comparing the at least one resource utilization value of the at least one virtual machine to a mapping of virtual machine resource utilization values to virtual machine power utilization values; and
   determining the predicted power utilization of the at least one virtual machine based, at least in part, on the mapping of the virtual machine resource utilization values to the virtual machine power utilization values;
   wherein the determining of the predicted power utilization of the at least one virtual machine based, at least in part, on the mapping is performed as a function of one or morn configuration differences between the at least one virtual machine and one or more other virtual machines of at least one of the host devices; and wherein the steps of the method are executed by a processing device operatively coupled to a memory.

2. The method of claim 1 wherein the plurality of host devices comprise respective nodes of a cluster.

3. The method of claim 2 wherein the predicting of the power utilization of the at least one virtual machine comprises:
identifying one or more other virtual machines in the cluster comprising at least one configuration overlapping with at least one configuration of the at least one virtual machine;
computing an average power utilization of the one or more other virtual machines; and
using the average power utilization of the one or more other virtual machines as the predicted power utilization of the at least one virtual machine.

4. The method of claim 2 wherein the one or more configuration differences comprise a lack of a virtual machine in the cluster comprising at least one configuration overlapping with at least one configuration of the at least one virtual machine.

5. The method of claim 1 wherein the at least one resource utilization value comprises at least one of a central processing unit (CPU) utilization value and a memory utilization value of the at least one virtual machine.

6. The method of claim 1 wherein the power utilization data is retrieved through one or more operating system passthrough channels of the plurality of host devices.

7. The method of claim 1 wherein the identifying of the at least one virtual machine for migration comprises determining a resource imbalance between two or more of the plurality of host devices.

8. The method of claim 7 wherein the determining of the resource imbalance is based, at least in part, on the power utilization data of the plurality of host devices.

9. The method of claim 8 wherein the determining of the resource imbalance is further based, at least in part, on one or more of central processing unit (CPU) utilization and memory utilization of the plurality of host devices.

10. The method of claim 1 further comprising identifying at least a subset of the plurality of host devices as eligible target host devices based, at least in part, on the power utilization data of the plurality of host devices and utilization data of one or more additional resources of the plurality of host devices.

11. The method of claim 10 wherein the one or more additional resources comprise at least one of a central processing unit (CPU) and a memory, and the identifying of at least the subset of the plurality of host devices as eligible target host devices comprises ranking the plurality of host devices according to a combination of power utilization and utilization of the one or more additional resources by respective ones of the plurality of host devices.

12. The method of claim 10 wherein the determining of the target host device comprises ranking the eligible target host devices according to power utilization by respective ones of the eligible target host devices.

13. The method of claim 12 wherein the determining of the target host device further comprises assigning an eligible target host device with the least power utilization of the eligible target host devices as the target host device.

14. The method of claim 13 further comprising assigning an eligible target host device with a next least power utilization of the eligible target host devices as the target host device responsive to a failure of the migrating of the at least one virtual machine.

15. An apparatus comprising:
a processing device operatively coupled to a memory and configured:
to retrieve power utilization data of a plurality of host devices;
to identify at least one virtual machine for migration from a source host device to a target host device of the plurality of host devices;
to predict power utilization of the at least one virtual machine;
to determine the target host device based, at least in part, on the power utilization data of the plurality of host devices and the predicted power utilization of the at least one virtual machine; and
to migrate the at least one virtual machine from the source host device to the target host device;
wherein the predicting of the power utilization of the at least one virtual machine comprises:
identifying at least one resource utilization value of the at least one virtual machine;
comparing the at least one resource utilization value of the at least one virtual machine to a mapping of virtual machine resource utilization values to virtual machine power utilization values; and
determining the predicted power utilization of the at least one virtual machine based, at least in part, on the mapping of the virtual machine resource utilization values to the virtual machine power utilization values;
wherein the determining of the predicted power utilization of the at least one virtual machine based, at least in part, on the mapping is performed as a function of one or more configuration differences between the at least one virtual machine and one or more other virtual machines of at least one of the host devices.

16. The apparatus of claim 15 wherein the plurality of host devices comprise respective nodes of a cluster, and wherein, in predicting the power utilization of the at least one virtual machine, the processing device is configured:
to identify one or more other virtual machines in the cluster comprising at least one configuration overlapping with at least one configuration of the at least one virtual machine;
to compute an average power utilization of the one or more other virtual machines; and
to use the average power utilization of the one or more other virtual machines as the predicted power utilization of the at least one virtual machine.

17. An article of manufacture comprising a non-transitory processor-readable storage medium having stored therein program code of one or more software programs, wherein the program code when executed by at least one processing device causes said at least one processing device to perform the steps of:
retrieving power utilization data of a plurality of host devices;
identifying at least one virtual machine for migration from a source host device to a target host device of the plurality of host devices;
predicting power utilization of the at least one virtual machine;
determining the target host device based, at least in part, on the power utilization data of the plurality of host devices and the predicted power utilization of the at least one virtual machine; and migrating the at least one virtual machine from the source host device to the target host device;

wherein the predicting of the power utilization of the at least one virtual machine comprises:

identifying at least one resource utilization value of the at least one virtual machine;

comparing the at least one resource utilization value of the at least one virtual machine to a mapping of virtual machine resource utilization values to virtual machine power utilization values; and determining the predicted power utilization of the at least one virtual machine based, at least in part, on the mapping of the virtual machine resource utilization values to the virtual machine power utilization values;

wherein the determining of the predicted power utilization of the at least one virtual machine based, at least in part, on the mapping is performed as a function of one or more configuration differences between the at least one virtual machine and one or more other virtual machines of at least one of the host devices.

18. The article of manufacture of claim 17 wherein the plurality of host devices comprise respective nodes of a cluster, and wherein, in predicting the power utilization of the at least one virtual machine, the program code causes said at least one processing device to perform the steps of:

identifying one or more other virtual machines in the cluster comprising at least one configuration overlapping with at least one configuration of the at least one virtual machine;

computing an average power utilization of the one or more other virtual machines; and using the average power utilization of the one or more other virtual machines as the predicted power utilization of the at least one virtual machine.

19. The article of manufacture of claim 17 wherein the power utilization data is retrieved through one or more operating system passthrough channels of the plurality of host devices.

20. The article of manufacture of claim 17 wherein the steps further comprise identifying at least a subset of the plurality of host devices as eligible target host devices based, at least in part, on the power utilization data of the plurality of host devices and utilization data of one or more additional resources of the plurality of host devices.

* * * * *

UNITED STATES PATENT AND TRADEMARK OFFICE
CERTIFICATE OF CORRECTION

PATENT NO. : 12,307,281 B2
APPLICATION NO. : 17/695446
DATED : May 20, 2025
INVENTOR(S) : Parminder Singh Sethi et al.

Page 1 of 1

It is certified that error appears in the above-identified patent and that said Letters Patent is hereby corrected as shown below:

In the Claims

Claim 1, Column 16, Line 66-67, please delete "one or morn" and insert therefor --one or more--

Signed and Sealed this
Seventeenth Day of June, 2025

Coke Morgan Stewart
*Acting Director of the United States Patent and Trademark Office*